United States Patent [19]
Krauthamer

[11] 3,711,759
[45] Jan. 16, 1973

[54] A-C ENERGIZING SYSTEM WITH STATIC INTERRUPTER
[75] Inventor: Stanley Krauthamer, Monterey Park, Calif.
[73] Assignee: Borg-Warner Corporation, Chicago, Ill.
[22] Filed: June 18, 1971
[21] Appl. No.: 154,382

[52] U.S. Cl. .....................321/14, 317/20, 317/53, 333/76
[51] Int. Cl. ....................H02m 1/18, H02h 7/14
[58] Field of Search ...317/20, 53; 321/9, 14; 307/92, 307/94, 100; 333/24, 76; 323/76, 79, 80

[56] References Cited
UNITED STATES PATENTS

| 1,625,464 | 4/1927 | Gay | 317/20 X |
| 1,755,111 | 4/1930 | Gay | 317/20 X |
| 3,436,600 | 4/1969 | Salo | 317/20 |
| 1,651,021 | 11/1927 | Field | 317/16 X |
| 3,295,018 | 12/1966 | Cook | 317/23 |
| 3,356,900 | 12/1967 | Kalkner | 317/20 |

FOREIGN PATENTS OR APPLICATIONS

| 1,114,243 | 5/1968 | Great Britain | 321/14 |
| 1,131,504 | 10/1968 | Great Britain | 317/20 |

Primary Examiner—William H. Beha, Jr.
Attorney—Donald W. Banner et al.

[57] ABSTRACT

A system for energizing an AC load from an inverter, or from other single- or multi-phase power sources or combination thereof, includes a series filter comprising a capacitor coupled in series with an inductor. The filter elements are resonant at the normal operating frequency of the inverter. Responsive to a large overload or a fault condition in the system, a virtual short circuit is applied across one of the filter components to detune the filter. Alternatively if a load exceeding a specified value is applied, a clamp detunes the filter. This significantly increases the effective impedance seen by the inverter or other power sources, protecting the system against excess currents.

3 Claims, 11 Drawing Figures

Inventor
Stanley Krauthamer
By James J. Jennings, Jr.
Attorney

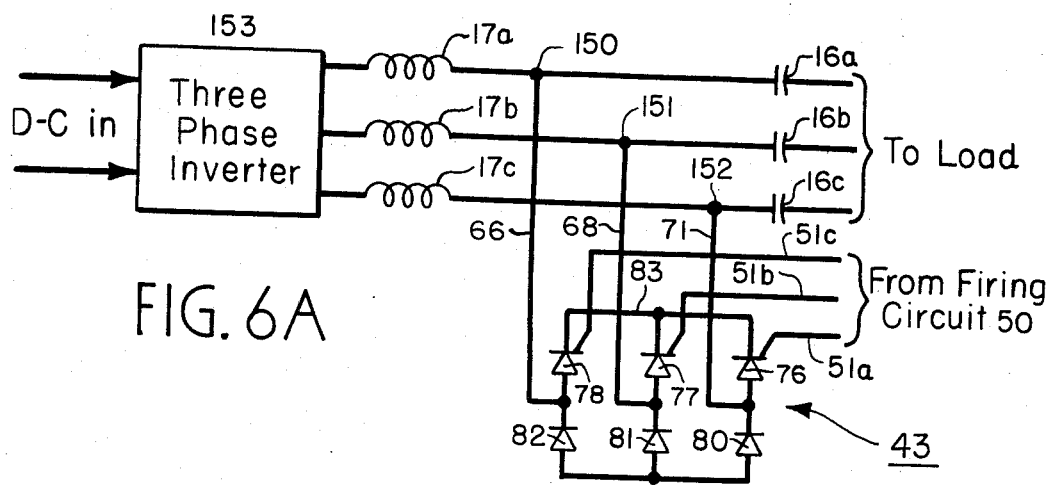
FIG. 6A
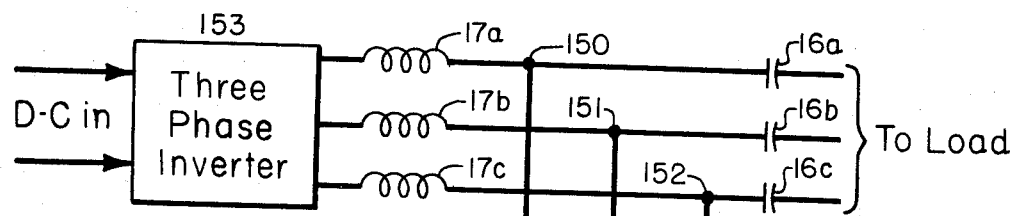
FIG. 6B
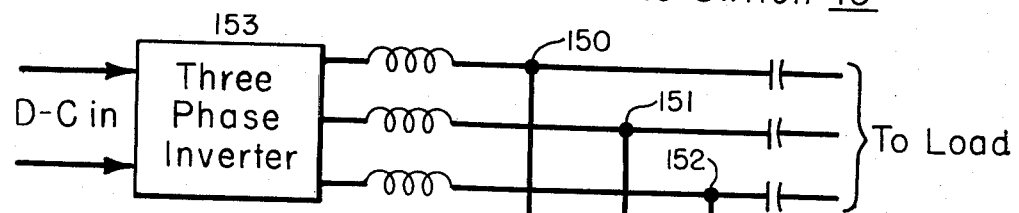
FIG. 6C
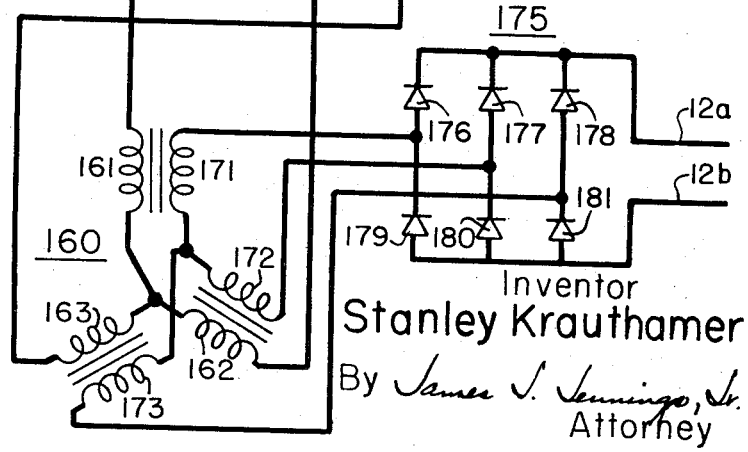
Inventor
Stanley Krauthamer
By James J. Jennings, Jr.
Attorney Inventor
Stanley Krauthamer By *James J. Jenninge, Jr.*
Attorney

3,711,759

A-C ENERGIZING SYSTEM WITH STATIC INTERRUPTER

BACKGROUND OF THE INVENTION

Since the early days of the power supply and distribution industry, there has always been a need for effective circuit breaker arrangements to protect the supply equipment when faults occur on the line or on the load serviced by the equipment. To this end various types of switches were developed as circuit breakers to interrupt the supply circuit, either automatically when an overload was sensed, or manually when an attendant noticed an abnormal condition. A disadvantage of most such arrangements is the finite time required for the physical displacement of a switch or other circuit-opening arrangement to protect the equipment. Thus a primary consideration of the present invention is to provide a protective arrangement for an energy supply system which does not require the physical movement of any component to effect the circuit protection. Such an arrangement provides circuit protection without the time delays associated with fuses and mechanical circuit interrupters.

Another important consideration of the present invention is to utilize components already in the circuit, and modify the normal operation to in effect derive another function — that of circuit protection — from a component employed in the circuit for another purpose.

SUMMARY OF THE INVENTION

The present invention is useful in an energizing system which applies AC energy from an inverter or other power source over a filter which includes first and second series-coupled reactive components, such as a capacitor coupled in series with an inductor. These components form a filter circuit which is resonant at the normal operating frequency of the inverter. Circuit means is provided, and coupled to one of the reactive filter components, to effect a substantial change in the effective impedance of that one reactive component. In a preferred embodiment this circuit means includes a static switch and a very low value resistance. This resistance is coupled, upon operation of the static switch, over a transformer to shunt one of the reactive components in the series filter.

A control circuit is also provided, and connected to regulate operation of the circuit means responsive to the detection of an overload condition associated with the inverter. In a preferred embodiment this is accomplished by sensing the undesired condition, such as a fuse failure, or a current overload in a circuit associated with the inverter or the load. Responsive to the detection of this undesired condition, the static switch is closed to substantially change the impedance of the one reactive component. This removes the resonant condition, and offers a higher impedance at the output side of the inverter. This substantial change in circuit parameters thus protects the inverter against a short circuit or other fault condition.

THE DRAWINGS

In the several figures of the drawings like reference numerals identify like elements, and in the drawings:

FIGS. 6A, 6B, 6C, 7A and 7C are schematic showings.

GENERAL SYSTEM DESCRIPTION

Figure 1:
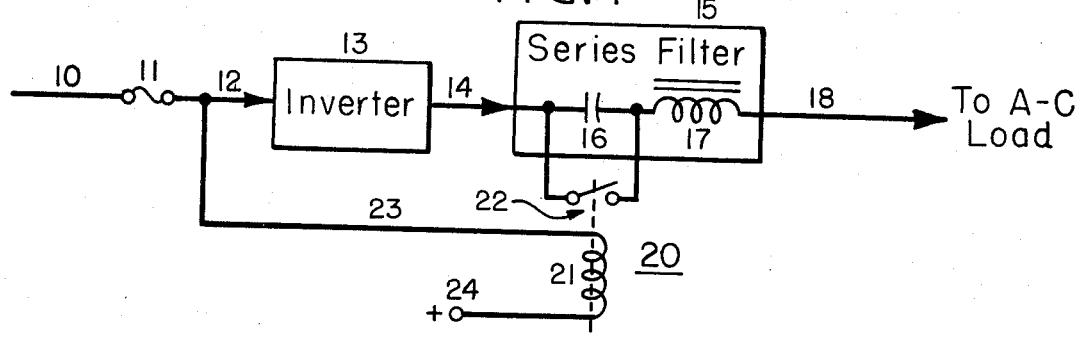
FIGS. 1 and 2 are propaedeutic illustrations useful in understanding basic arrangements of the invention.

FIG. 1 shows a system with DC energy being supplied over input line 10, fuse 11, and line 12 to an inverter 13. The inverter passes output AC energy over line 14, series filter 15, which includes a capacitor 16 and an inductor 17, and over an output line 18 to any AC load. The first and second reactive components 16 and 17 within the filter are sized and connected to be resonant at the normal operating frequency of the AC output voltage supplied by inverter 13. Accordingly the net effective impedance to the energy flow between inverter 13 and output line 18 is very low at the normal operating frequency, where the reactance of the capacitor is substantially equal to the reactance of the inductor. Those skilled in the art will appreciate this arrangement can be employed with any AC supply line 14, including systems other than those having an inverter to provide the AC voltage which is passed to the filter.

In accordance with the present invention, a circuit means shown as relay 20 is provided. The relay includes a winding 21 and a contact set 22 which, when closed, effectively short circuits capacitor 16. Line 23 and energizing terminal 24 together represents a control circuit connected to regulate operation of the relay. That is, a potential is applied to terminal 24 substantially equal to that present on line 12 under normal operating conditions. Responsive to an overload or fault such that fuse 11 blows, the potential on line 12 rapidly changes. The resultant net potential difference between line 23 and terminal 24 is applied across relay winding 21, actuating the relay and closing contacts of 22 to virtually short circuit capacitor 16. This is a substantial change in the effective impedance of the reactive component 16, so that the net reactance of inductor 17 minus that of capacitor 16 is "inserted" in the circuit. Before the operation of the relay 20, the two impedances in the filter virtually cancelled each other. After relay 20 is actuated, the unbalance between the two reactances is inserted into the circuit to protect the total system arrangement. Thus a fault in the load, which would otherwise tend to draw excess current, is no longer the substantial hazard it was if the present invention is employed.

Figure 2:
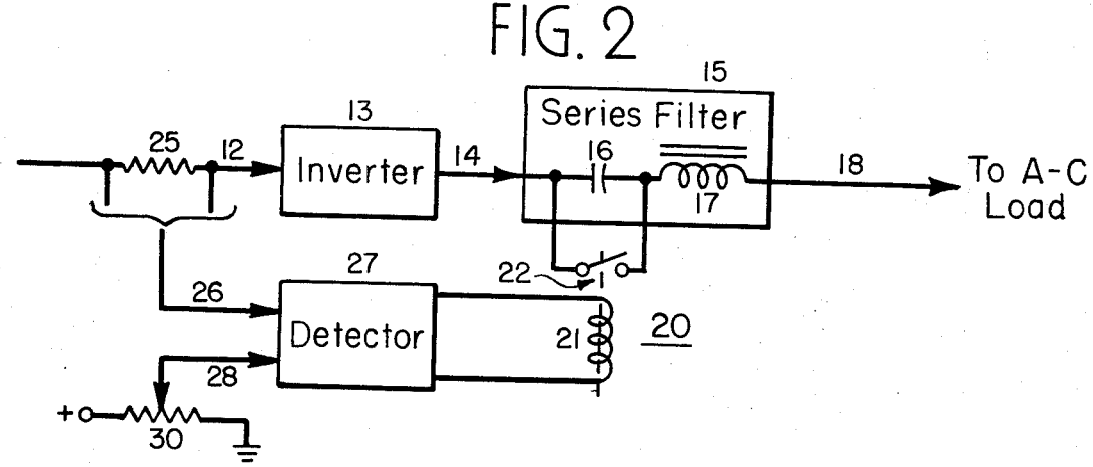

It may be desired to protect the system against slight changes in the current level, changes of a level insufficient to blow fuse 11. FIG. 2 shows such an arrangement in which a resistor 25 of very low ohmic value is inserted in the supply line to inverter 13. Thus a signal indicative of the current flow is applied over line 26 to a detector circuit 27. This circuit also receives a reference signal over line 28 from a potentiometer 30. Accordingly when the current level signal on line 26 exceeds the reference level established by the position of the arm of potentiometer 30, detector 27 provides an output signal to actuate relay 20 in a well known manner. At this time the series filter is de-tuned by the short circuiting of capacitor 16, and the inverter and other circuit components are protected against damage by excessive current.

DETAILED DESCRIPTION OF THE INVENTION

Figure 3:
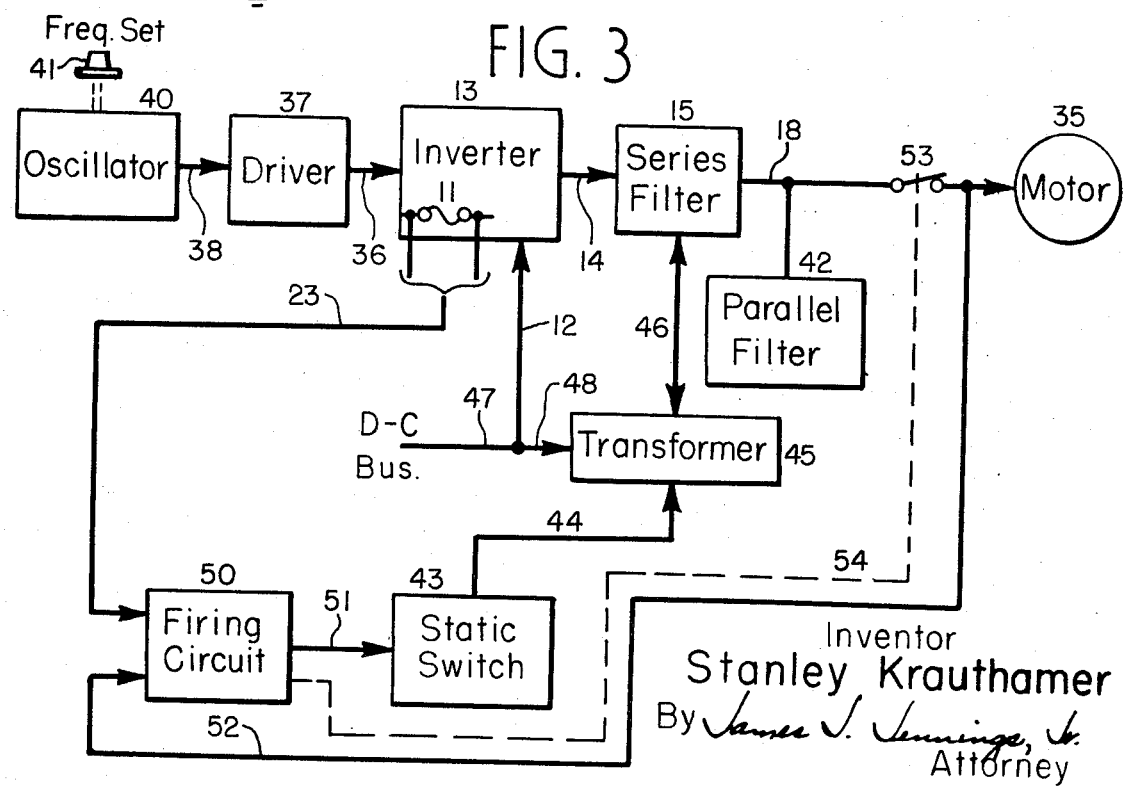
FIG. 3 is a block diagram illustrating the incorporation of the present invention in a motor control system.

FIG. 3 depicts a general system for regulating the operation of an AC motor 35. As there shown inverter 13 receives frequency-controlling pulses over line 36 from a driver stage 37, which in turn receives a series of timing pulses over line 38 from an oscillator 40 which has a frequency set adjustment represented by knob 41. By regulating the frequency of the oscillator pulses, the frequency of alternation of the inverter output voltage is governed, and thus the speed of motor 35 is correspondingly regulated in a well known manner. Another filter 42 is shown connected in parallel with output line 18. Such a parallel-connected filter is sometimes used for ripple attenuation. The details and further explanation of such an arrangement are not necessary to an understanding or implementation of the present invention.

In accordance with the present invention, a static switch 43 is provided to effect a circuit operation analogous to the operation of relay 20 in FIGS. 1 and 2. In its operation static switch 43 reflects a very low impedance or resistance over line 44, transformer 45 and line 46 to one of the reactive components in series filter 15. Energy from the DC bus 47 is passed over line 12 to the inverter, and is also passed over line 48 and a portion of transformer 45 to the static switch, as will be described more fully hereinafter.

Figure 4:
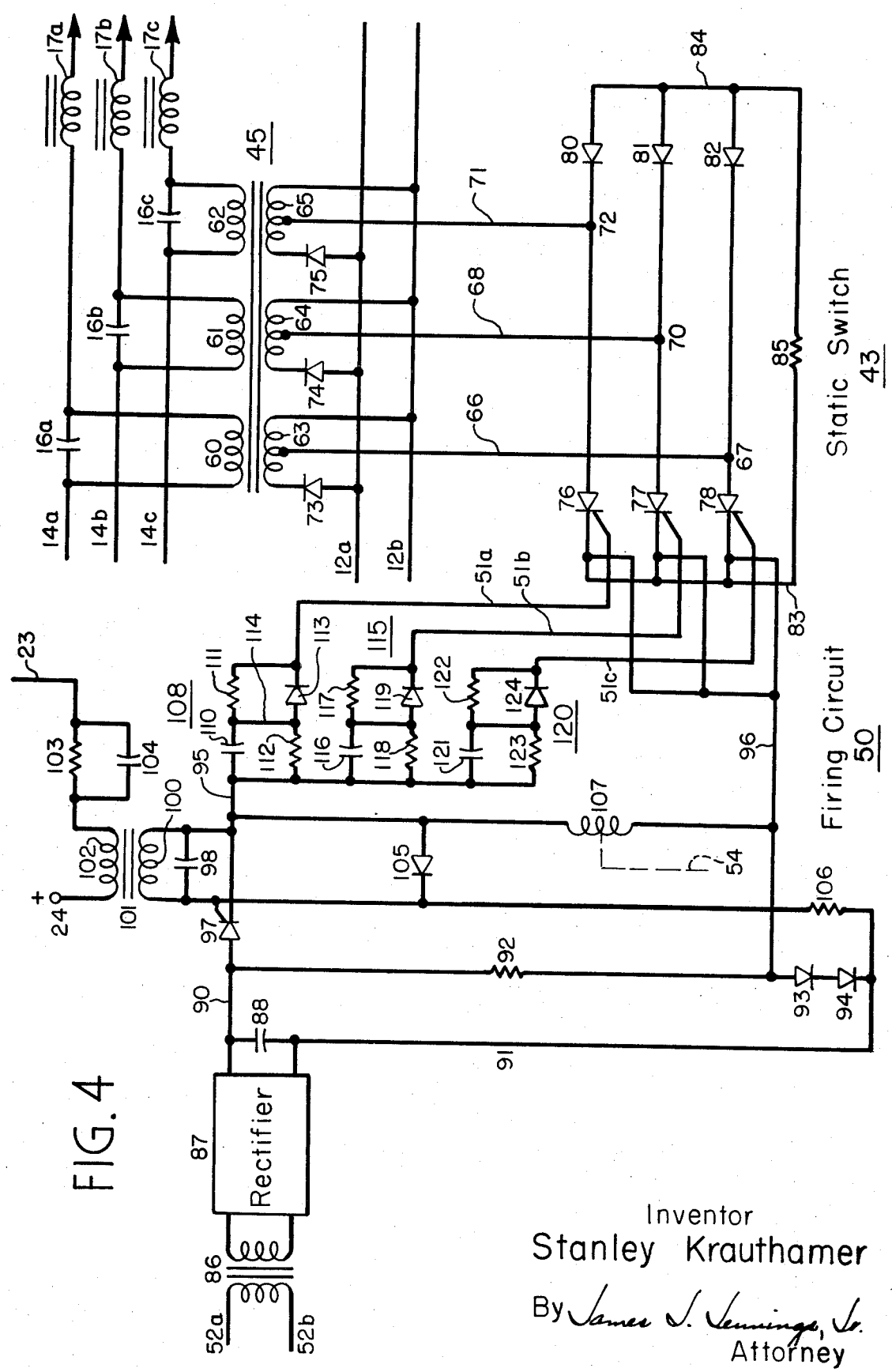
FIG. 4 is a schematic diagram depicting circuit details of a preferred embodiment of the present invention.

A firing circuit 50 provides a control signal over line 51 to regulate operation of static switch 43. The firing circuit receives AC energy over line 52, which is rectified within circuit 50. A control input signal is received by the firing circuit over line 23 from a fuse 11, shown in this arrangement within inverter 13. Of course, the fuse can be positioned externally to the inverter, or the signal could come from a detector stage such as that represented by 27 in FIG. 2. After a predetermined time, a relay is actuated within firing circuit 50 to effect the opening of contact set 53 over the mechanical actuator represented generally by broken line 54, to interrupt energization of motor 35. With this perspective of the system as a whole, a more detailed description of the arrangement shown in FIG. 4 will now be set out.

As there shown the invention is illustrated in connection with a three-phase system. Those skilled in the art will appreciate that the principles are also applicable to a single-phase or two-phase system, by removing two or one of the phase circuits and the attendant circuitry shown in FIG. 4.

As there shown the three-phase output voltage from an inverter or other AC source is passed over lines 14a, 14b, and 14c toward the load. The series filter in line 14a includes capacitor 16a and inductor 17a; filter 16b and 17b is connected in line 14b; and in line 14c, a filter comprising capacitor 16c and inductor 17c is coupled. Transformer 45 has three windings 60, 61, and 62 coupled to the respective windings 63, 64 and 65. Winding 60 is coupled in parallel with capacitor 16a in the first phase circuit, and the other windings 61, 62 are similarly coupled across the respective capacitors in the other phase circuits. Of course these windings could be coupled across the inductors, instead of across the capacitors. As long as one of the reactive components is shorted, the effective reactance of the other serves to limit the load current upon a fault or current overload.

The center tap connection of winding 63 is coupled over line 66 to a connection 67 in the static switch 43. Likewise line 68 extends the connection from the center tap connection of winding 64 to connection 70 in the static switch, and the center tap connection of winding 65 is extended over line 71 to connection 72 in the static switch 43. Diode 73 is coupled between bus conductor 12a and one side of winding 63; diodes 74 and 75 are similarly coupled between the additional windings 64, 65 and the DC bus conductor 12a. Thus when an overload condition occurs, for example on line 14a, a voltage is developed across capacitor 16a which increases above the normal voltage across this capacitor. This increased voltage is applied over windings 60, 63 of transformer 45 and diode 73 to the DC bus 12a, 12b. However with the diode connection this voltage across capacitor 16a is effectively clamped at the level of the main DC bus voltage across conductors 12a, 12b. Thus the vector difference in the voltages across reactive components 16a and 17a provides an effective current-limiting reactance with respect to the AC line.

Static switch 43 includes a half-wave three-phase bridge, with three SCR's 76, 77 and 78 and three diodes 80, 81 and 82. Each of the SCR's has its cathode coupled to common conductor 83, and each of the diodes has its anode coupled to another common conductor 84. In a single-phase system only one set of SCR-diode connections would be provided. For example, with only a single series filter including capacitor 16a and inductor 17a, only windings 60 and 63 would be provided, and SCR 78 would be coupled to diode 82 as shown. Resistor 85 is provided as a very low resistance between the common conductors 83 and 84. This is the level of the resistance or impedance reflected back over transformer 45 to shunt the reactive components in the series filter. In a preferred embodiment this reactance was of a very low ohmic value, 0.055 ohm. The resistor was rated at 200 watts because of its position in the circuit. Those skilled in the art will understand that resistive wire or another similar component could be provided in place of the illustrated resistor 85.

In firing circuit 50, transformer 86 is connected to pass AC energy received over lines 52a, 52b to a rectifier circuit 87 for providing a low DC voltage across capacitor 88, which is applied between conductors 90, 91 to energize the components in the firing circuit. Between conductors 90, 91 is a series circuit comprising resistor 92 and diodes 93, 94. These components are sized to provide a DC voltage of the appropriate level between conductors 95, 96 when a firing signal is applied to the gate of SCR 97. SCR 97 has its anode connected to conductor 90, its cathode connected to conductor 95 and its gate coupled both to one side of a capacitor 98, and to one side of the secondary winding 100 of a transformer 101, which also includes a primary winding 102. One end of primary winding 102 is coupled to terminal 24, and the other end is coupled over a parallel circuit including resistor 103 and a capacitor 104 to conductor 23, over which the fuse failure, overcurrent, or other fault indication is received.

The other side of secondary winding 100 and of capacitor 98 is coupled to conductor 95. The gate of SCR 97 is also coupled to the cathode of diode 105, and to one side of resistor 106, the other end of which is coupled to conductor 91. Relay winding 107 is coupled between conductors 95, 96. Accordingly upon firing of SCR 97 this relay winding is energized to open the contact set 53 (FIG. 3) after a predetermined time interval, thus protecting both the switching arrangement and the main energy path from severe damage.

Conductor 96 is coupled to the cathode of each of the SCR's 76, 77 and 78. The firing circuit is completed to the three gates over three individual isolation circuits. Circuit 108 for the gate of SCR 76 includes a capacitor 110 coupled in series with resistor 111, and another resistor 112 coupled in series with diode 113. These two series circuits are coupled in parallel, and the intermediate points are coupled together over a conductor 114. Thus any potential applied between conductors 95, 96 is translated over circuit 108 and applied between the gate and cathode of SCR 76 to rapidly drive this semiconductor switch on. The gate circuit 115 for the SCR 77 includes components 116–119, and gate circuit 120 for the third SCR 78 includes components 121–124.

In operation, it is assumed that the motor control system is energized and AC energy is being transferred over conductors 14a, 14b and 14c toward the AC motor or any other AC load. At this time AC voltage is passed over transformer 86 and rectified in circuit 87, to provide a DC operating potential between conductors 90 and 91 in firing circuit 50. Under normal conditions, when there is no overload or fuse failure, SCR 97 remains nonconducting and all of SCR's 76, 77 and 78 are nonconducting.

If there is an overcurrent condition on the AC line, of a level sufficient to cause the voltage to rise across the capacitors 16a–16c but not sufficient to blow the fuse, the voltage across capacitors 16a–16c is clamped as explained above. The excess voltage is returned over the circuit including diodes 73–75 to the DC bus 12a, 12b. Thus there is a certain level of protection afforded by the clamping arrangement even before a fuse failure or other serious fault occurs.

Responsive to the failure of a fuse or an excess overcurrent condition, a signal is provided on line 23 which passes a control pulse signal over transformer 101 to the gate of SCR 97. SCR 97 is gated on and completes a circuit between conductors 90 and 95, to pass gating pulses over each of circuits 108, 115, and 120 to the respective gates of SCR's 76–78. These SCR's are fired, and in effect connect low resistance 85 across the windings 63–65 of transformer 45. This low impedance is reflected across the windings 60–62 to substantially short out capacitors 16a–16c. This removes the resonant condition of the filter, and the inductors 17a, 17b and 17c then protect the output circuit from excess current conditions.

At a time interval determined by the constants of the relay including winding 107, such as the setting of a dashpot arrangement, this relay operates and opens contact set 53 to interrupt the transfer of energy toward the AC load 35. Thus the resistor 85 is prevented from overheating. With interruption of the energy transfer, the AC voltage is also removed from conductors 52a and 52, and firing circuit 50 is de-energized.

The use of static switch 43 and firing circuit 50, in conjunction with transformer 45, provides very effective short circuit decoupling in the circuit between the inverter and the AC load. It has been found that use of the transformer 45 itself, together with the diodes 73–75 for clamping back to the DC bus, provides a significant measure of protection even without the static switch and firing circuit. The current limiting achieved between the inverter and the load, employing only the transformer and diode, insures that an excessive fault current will not be transmitted over the inverter-load circuit if there is a short at the load or some other failure in the system. Thus this current limiting feature can be utilized apart from the complete filter detuning aspect of this invention.

Figure 5:
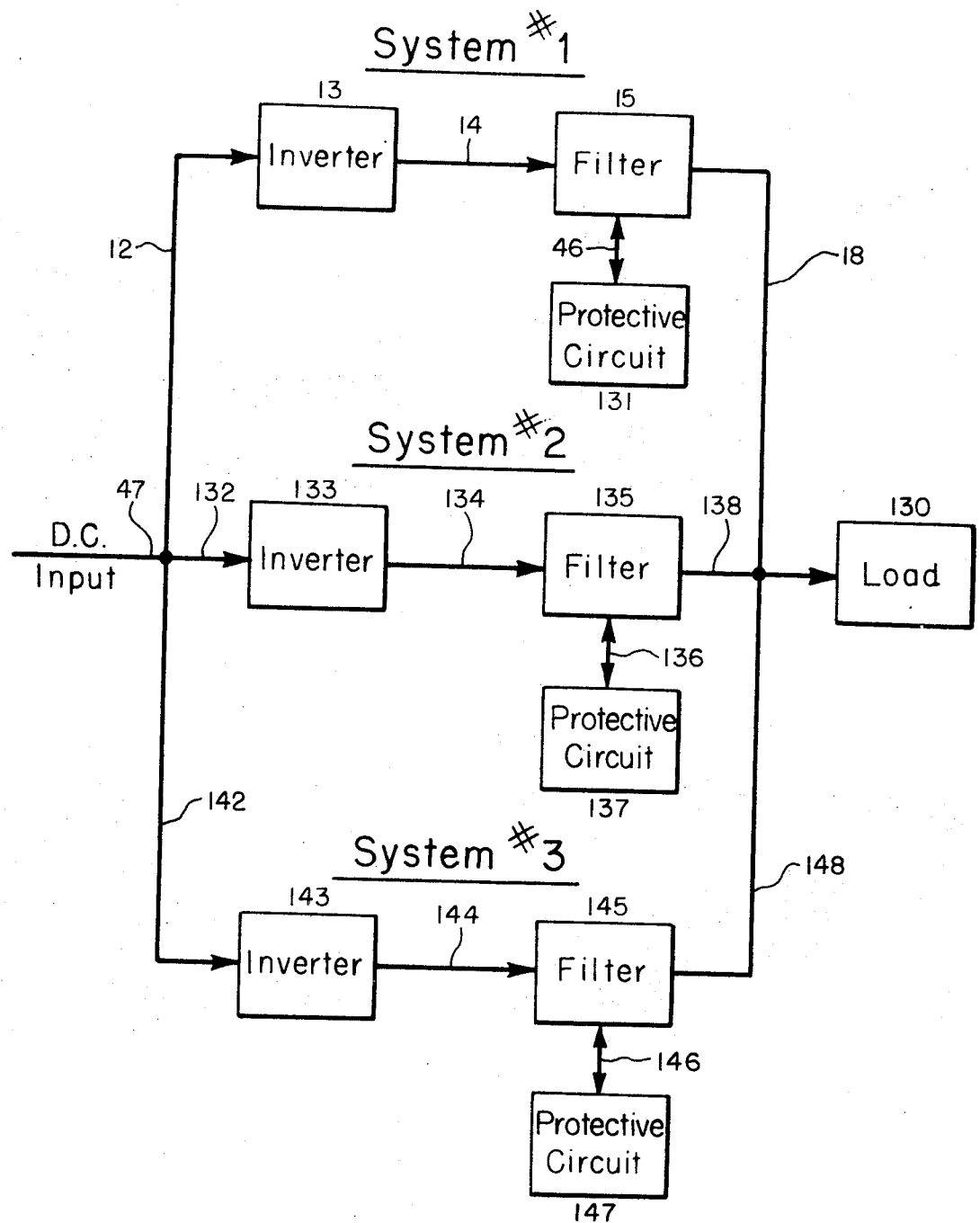
FIG. 5 is a block diagram of a three-phase energization system incorporating the invention.

FIG. 5 shows a general system arrangement in which a plurality of AC systems, each including an inverter such as 13 and a series-coupled filter such as 15, are connected to supply AC energy to any AC load 130. The inverter and filter combination such as 13–15 has already been described in connection with FIGS. 1–3. The protective circuit in system No. 1 of FIG. 5 is referenced 131, and may include components such as transformer 45, static switch 43, and firing circuit 50. As has already been emphasized, protective circuit 131 could include only the transformer and diodes for clamping the voltage across one of the reactive filter components at the DC bus level.

System No. 2 includes a similar inverter-filter combination. Inverter 133 receives DC input energy over line 132, and passes AC energy over line 134 to filter 135, which is coupled over line 138 to the load 130. Protective circuit 137 of system No. 2 is coupled over line 136 to filter 135. Similarly in system No. 3 DC energy from bus 47 is supplied over line 142 to inverter 143, which passes AC energy over line 144, through filter 145 to output line 148. Protective circuit 147 is coupled over line 146 to filter 145. The DC input energy can be supplied to the input lines 12, 132, and 142 from individual batteries, DC generators, or other sources, in lieu of a common bus as indicated. Other variables of the basic system may be suggested to those skilled in the art.

With the system of FIG. 5 energized and supplying load 130, if one system such as No. 1 fails, then it is desirable to decouple system No. 1 from systems No. 2 and No. 3. If this is done the fault current supplied by systems No. 2 and No. 3 would be sufficiently high to destroy these other operating systems. This is an important use of the protective circuit arrangement shown generally in FIG. 3 and more specifically in FIG. 4.

FIG. 6A depicts another arrangement for protecting the inverter-load energy transfer circuit, by modifying the normal series filter configuration. In accordance with this aspect of this invention, static switch circuit 43 is coupled to the common connections or terminals 150, 151 and 152 between the series-connected inductor and capacitor in each of the output circuits. In the arrangement depicted in FIG. 4, if there is a "lock-on" (inverter component failure), or a summing transformer failure, the load sees an inductive impedance.

This is also true if failure of an inductor in any of the series-connected filters occurs. Under these fault conditions the load must feed a substantial current, at a low power factor, into the fault. However by utilizing the circuit of FIG. 6A, when the inverter fails or locks on, static switch 43 is immediately triggered on. This firing of the static switch essentially shorts terminals 150, 151 and 152 together. Thus a three-phase, Y-connected capacitor arrangement is presented to the three-phase load. This arrangement completely isolates the load from any lock-on or inverter component failure, from any failure of a summing transformer, or from an inductor failure. The load then sees a leading power factor, thus improving the system operation. The system is still operational if one of the capacitors fails.

FIG. 6B illustrates another circuit arrangement which utilizes the common terminals 150, 151 and 152 in the series filters. As there shown the upper windings 60, 61 and 62 of transformer 45 are coupled to the common terminals 150, 151 and 152. With this arrangement current limit is applied to the common connections, instead of across a reactive component in the filter circuit. The arrangement of FIG. 6B can be used independently or with the arrangement of FIG. 6A, with both the static switch and the firing circuit being connected as depicted previously in FIG. 4.

An alternate method of coupling transformers across common terminals 150-152 is set out in FIG. 6C. As there shown a three-phase transformer 160 includes primary windings 161, 162 and 163, magnetically coupled to the respective secondary windings 171, 172 and 173. The secondary windings are coupled through a rectifier bridge 175, which includes six diodes 176-181, to the DC bus conductors 12a and 12b. In this way the respective line-to-line voltages, such as the voltage between terminals 150 and 151, are clamped back to the DC bus level. By preventing these line-to-line voltages from rising, current limit is achieved with the arrangement shown in FIG. 6C.

Figure 7A:
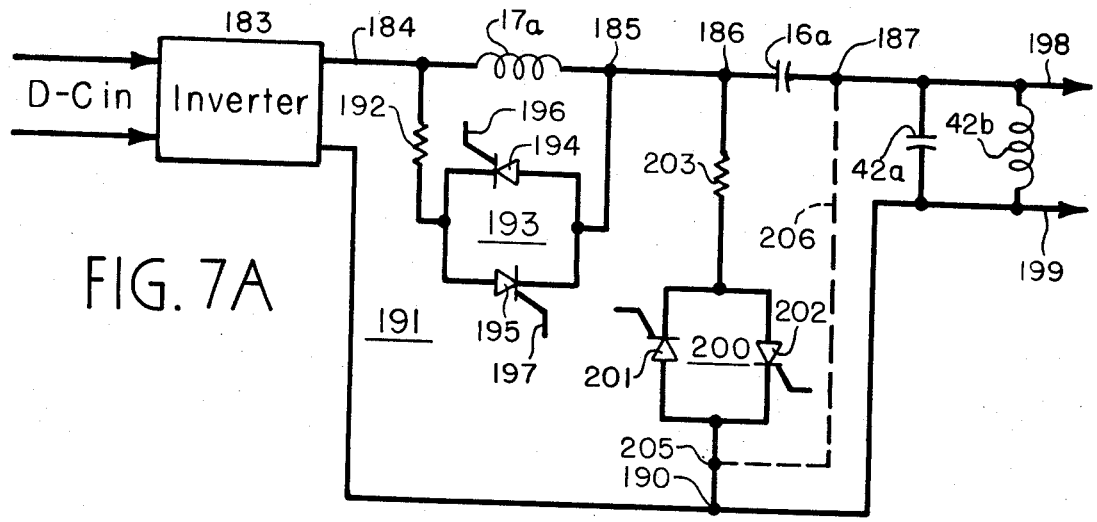

FIG. 7A indicates another circuit for modifying the series-connected filter including reactive components 17a and 16a. As shown one output connection from inverter 183 is extended over line 184, inductor 17a, terminals 185, 186, capacitor 16a, terminal 187 and output conductor 198 toward the load. The other output connection from inverter 183 is coupled over conductor 188, terminal 190 and output conductor 199 to complete the energizing circuit. Capacitor 42a and inductor 42b comprise a parallel filter, as described generally in connection with FIG. 3.

The arrangement of FIG. 7A is useful as a transient suppressor for uninterruptable power supply (UPS) systems. In accordance with this aspect of the invention a by-pass circuit 191 is provided around inductor 17a. This bypass circuit includes a resistor 192 coupled in series with a static switch 193. As shown the static switch comprises a pair of parallel-connected SCR's 194, 195. As gating signals are received over conductors 196, 197. these SCR's are gated on. This completes a shunting circuit so that resistor 192 is essentially connected to by-pass inductor 17a. Those skilled in the art will appreciate that static switch 193 can be replaced by a thyristor of the type generally termed a Triac, to provide conduction in both directions from a single semiconductor switch.

Another static switch 200, including another pair of back-to-back SCR's 201, 202, is coupled in series with a resistor 203. This circuit is coupled between terminals 186 and 190, so that upon actuation of the static switch 200, resistor 203 is placed in the circuit between output conductor 199 and the common terminal 186 in the filter 17a, 16a.

Figure 7B:
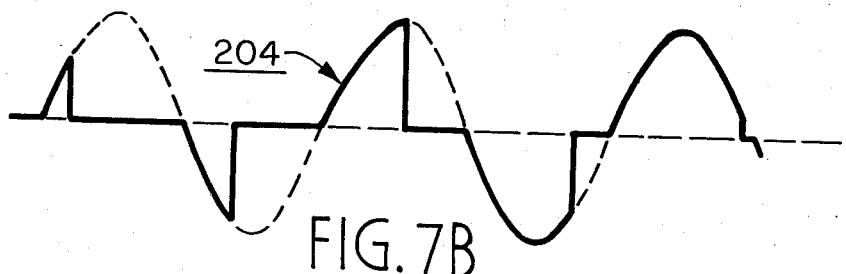
FIG. 7B is a graphical illustration, of additional embodiments of the invention.

When the load is initially applied across conductors 198, 199, the first static switch 193 is fired by applying gating signals over conductors 196, 197. The signals can be provided from the same logic circuit which regulates the frequency of operation of inverter 183, or from an independent logic circuit. The closure of static switch 193 places resistor 192 across inductor 17a, so that load current primarily flows through resistor 192 and capacitor 16a. The on time of the switch is gradually increased, as shown in the successive half-cycles of the waveform 204 in FIG. 7B. The static switch is no longer in the circuit after the load current reaches rated value. This arrangement insures that very little transient disturbance appears at conductors 198, 199 as the load is initially applied.

In the reduction of load current, the circuit including static switch 200 is utilized. In this arrangement the lower connection of the static switch is coupled over a terminal 205 to terminal 190. This static switch is then time-modulated as already explained in connection with FIG. 7B. It is also apparent, from the previous explanation of the use of a clamping transformer (see, for example, FIG. 6B), that terminals 186 and 190 can be clamped back to the DC bus to provide another measure of regulation.

An alternative connection for static switch 200 is represented by the dashed line 206. That is, the connection between terminals 205 and 190 can be interrupted, and the connection from terminal 205 extended up to terminal 187. This affords current control across capacitor 16a during load application analogous to that described in connection with static switch 193 and inductor 17a.

Figure 7C:
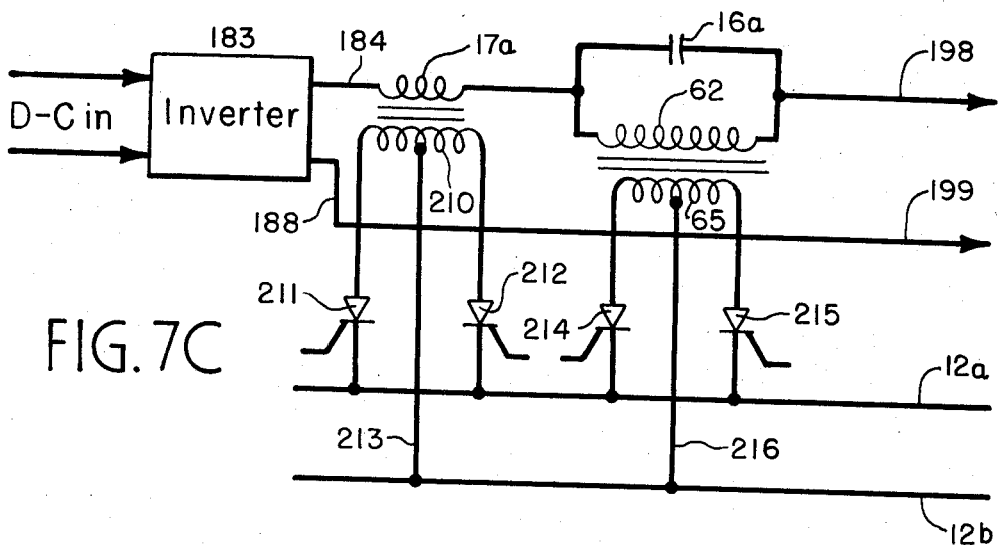

FIG. 7C illustrates an alternate method of minimizing the transient effect during load application and subsequent removal of the load. One output line 184 from inverter 183 is coupled through inductor 17a and capacitor 16a in the series filter. The other line 188 is connected directly to output conductor 199. A secondary winding 210 is magnetically coupled to inductor 17a to provide a transformer assembly, in which winding 210 has a pair of end connections and a center tap connection. A pair of SCR's 211, 212 are coupled between the respective end connections of winding 210 and DC bus conductor 12a. The center tap connection of winding 210 is coupled directly to DC bus conductor 12b. Transformer 62, 65 provides a similar coupling to the DC bus conductors from capacitor 16a, over a circuit including SCR's 214, 215 and conductor 216.

Utilizing the arrangement of FIG. 7C, gradual application of the load is accomplished by "programming" or gradually modifying the on times of SCR's 211, 212 as explained above in connection with FIGS. 7A and 7B. Load removal is accomplished in a similar manner, by regulating the times of conduction and non-conduction of the SCR's 214, 215.

SUMMARY

It is manifest that the protection of the energy transfer system can be achieved either from a signal indicating internal component failure, such as a fuse blowing in the inverter or some associated circuit, or an overcurrent condition can be sensed as described generally in connection with FIG. 2. By placing a virtual short circuit across either of the two series-coupled reactive components in the filter, the other filter component limits the transfer of load current under the fault condition. This is done very rapidly, without any physical movement by completely static components. The subsequent physical interruption of the energy transfer circuit, as by the operation of the relay including winding 107, is a refinement of the invention. By using only the transformer and diodes clamped back to the DC bus, load current has been reduced below 80 percent of the normal or rated current by de-tuning the filter. With multiple systems, as shown in FIG. 5, use of the invention decouples the system with the fault from the still operating systems. Were this not done, the remaining systems would be severely damaged as they attempted to supply the fault current. Protection for the inverter-load circuit can also be achieved by coupling the protective circuits in a line-to-line arrangement, with the connections being made to the common terminals between the reactive filter components. Use of static switches across the reactive filter components, and programming these switches during load application and load removal, minimizes transient effects on the system.

While only particular embodiments of the invention have been described and illustrated, it is manifest that various modifications and alterations may be made therein. It is therefore the intention in the appended claims to cover all such modifications and alterations as may fall within the true spirit and scope of the invention.

What is claimed is:

1. An energizing system for passing AC energy from an inverter over a filter which includes a capacitor coupled in series with an inductor, the reactances of the capacitor and inductor being substantially equal at the normal frequency of the inverter AC output voltage, including the improvement which comprises:

coupling means, having a first portion coupled in parallel with one of the reactive components of the filter, and having a second portion magnetically coupled to the first portion;

a static switch, including a reference impedance of very low value, and at least one semiconductor switch, connected such that conduction of the semiconductor switch effectively couples the reference impedance over the coupling means to substantially short out the filter component coupled in parallel with the first portion of the coupling means; and a firing circuit, connected to provide a control signal for turning on the semiconductor switch upon detection of an overload condition associated with the inverter.

2. An energizing system having an inverter energized from a DC bus, the inverter passing AC energy over a filter which includes a capacitor series-coupled with an inductor, with the reactances of the capacitor and inductor being substantially equal at the normal frequency of the inverter AC output voltage, including the improvement which comprises:

a transformer, having a first winding coupled across the capacitor, a second winding magnetically coupled to the first winding, and a center tap connection on the second winding;

means including a rectifier for coupling the DC bus to the second winding of the transformer, to clamp the voltage across the capacitor at the DC bus level when the capacitor voltage tends to increase;

a static switch, including a diode coupled in series with a semiconductor switch between a pair of reference conductors, a low impedance coupled between the same reference conductors, and means for coupling the center tap connection of the second transformer winding to the common connection between the diode and the semiconductor switch, such that conduction of the semiconductor switch couples the low impedance across the transformer to shunt the capacitor in the filter; and a firing circuit, including a second semiconductor switch connected to be gated on when a signal denoting an overload condition is received by the firing circuit, and means for providing a supply voltage in the firing circuit, such that conduction of the second semiconductor switch passes the supply voltage to gate on the semiconductor switch in the static switch, effectively de-tuning the filter and reducing the AC current flow from the inverter.

3. An energizing system as claimed in claim 2 in which the firing circuit further comprises a relay, connected for actuation upon firing of the second semiconductor switch, to interrupt the energy transfer circuit between the filter and an AC load at a predetermined time after firing of the semiconductor switch in the static switch.

* * * * *